United States Patent
Fok et al.

(10) Patent No.: US 7,925,715 B2
(45) Date of Patent: Apr. 12, 2011

(54) APPARATUS AND METHODS FOR SERVICE PROGRAMMING OF A WIRELESS DEVICE ON A WIRELESS COMMUNICATIONS NETWORK

(75) Inventors: Kenny Fok, San Diego, CA (US); Tia Manning Cassett, San Diego, CA (US); Jihyun Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1003 days.

(21) Appl. No.: 11/370,013

(22) Filed: Mar. 6, 2006

(65) Prior Publication Data

US 2006/0218241 A1  Sep. 28, 2006

Related U.S. Application Data

(60) Provisional application No. 60/661,782, filed on Mar. 14, 2005.

(51) Int. Cl.
 *G06F 15/16* (2006.01)
 *G06F 15/177* (2006.01)
 *H04M 3/00* (2006.01)

(52) U.S. Cl. ........ 709/217; 709/218; 709/220; 455/418; 455/419; 455/420

(58) Field of Classification Search .................. 709/220, 709/221, 217, 244; 370/255; 726/2; 455/418–420
See application file for complete search history.

(56) References Cited

U.S. PATENT DOCUMENTS

| | | | |
|---|---|---|---|
| 5,465,288 A * | 11/1995 | Falvey et al. ................. | 455/418 |
| 6,490,445 B1 * | 12/2002 | Holmes ......................... | 455/419 |
| 6,493,549 B1 * | 12/2002 | Axelson et al. ............... | 455/419 |
| 6,549,770 B1 | 4/2003 | Marran | |
| 7,334,228 B2 | 2/2008 | Clohessy et al. | |
| 7,346,344 B2 | 3/2008 | Fontaine | |
| 7,590,086 B2 | 9/2009 | Olkkonen et al. | |
| 2002/0065063 A1 | 5/2002 | Uhlik | |
| 2002/0120744 A1 | 8/2002 | Chellis et al. | |

(Continued)

FOREIGN PATENT DOCUMENTS

EP          1227636 A2     1/2002

(Continued)

OTHER PUBLICATIONS

International Search Report and Written Opinion—PCT/US2006/009783, International Search Authority—European Patent Office—Sep. 19, 2006.

*Primary Examiner* — Wing F Chan
*Assistant Examiner* — David X Yi
(74) *Attorney, Agent, or Firm* — Sandip S. Minhas; Darren M. Simon

(57) ABSTRACT

Apparatus, methods, and programs for servicing persistent storage items on a wireless device. Embodiments include a wireless device having a computer platform with a module operable to retrieve and/or change persistent storage items on the wireless device based on a received configuration. The wireless device may further include an access module operable to either permit or deny access to persistent storage items based on information associated with the configuration. The embodiments may also include an apparatus operable to receive information relating to the activity performed with respect to the persistent storage items and to generate a corresponding report.

22 Claims, 8 Drawing Sheets

U.S. PATENT DOCUMENTS

| | | | |
|---|---|---|---|
| 2003/0023661 A1* | 1/2003 | Clohessy et al. | 709/104 |
| 2003/0222911 A1 | 12/2003 | Numano et al. | |
| 2004/0176133 A1 | 9/2004 | Lipsit | |
| 2004/0203745 A1* | 10/2004 | Cooper | 455/432.1 |
| 2004/0242197 A1* | 12/2004 | Fontaine | 455/411 |
| 2005/0088980 A1* | 4/2005 | Olkkonen et al. | 370/255 |

FOREIGN PATENT DOCUMENTS

| | | |
|---|---|---|
| JP | 61226842 | 10/1986 |
| JP | 2003208319 | 7/2003 |

* cited by examiner

APPARATUS AND METHODS FOR SERVICE PROGRAMMING OF A WIRELESS DEVICE ON A WIRELESS COMMUNICATIONS NETWORK

CLAIM OF PRIORITY UNDER 35 U.S.C. §119

The present Application for Patent claims priority to Provisional Application No. 60/661,782 entitled "Method And Apparatus For Providing Service Parameters For Wire less Devices" filed Mar. 14, 2005, and assigned to the assignee hereof and hereby expressly incorporated by reference herein.

BACKGROUND

The disclosed embodiments relate to wireless devices and wireless communication networks, and more particularly, to apparatus and methods for remote service programming of a wireless device on a wireless network.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

The operation of these wireless devices depends on many settings and profiles retained within persistent storage, referred to herein as persistent storage (PS) items. Persistent storage items comprise data that remains in a memory on the wireless device for each time the wireless device is started or re-started. Persistent storage items may be stored in many different locations on a wireless device, e.g. read-only memory, flash memory, subscriber identity module (SIM), universal subscriber identity module (U-SIM), a file system, a remote file system, etc., or even at a network device located across the wireless network where the persistent storage items would be accessible to the wireless device. Some examples of these persistent storage items are network preferred roaming list, transmission strength, a user's telephone book, and mobile directory number.

Many groups need to retrieve or change the values of persistent storage data, e.g. the users of the wireless devices, the network service providers, the wireless device manufacturers, and the developers of software applications for the wireless devices.

Currently manufacturers of wireless devices often write their own applications for changing the persistent storage data. This can be expensive and often the manufacturers write their applications with different user interfaces, which can make it difficult for the various groups of people that need to retrieve or change persistent storage items to learn the various user interfaces that the manufacturers write. Further, often the applications written by the manufacturers require being run on a separate computer device that is directly connected to the wireless device. This can cause many problems, for example, because manufacturer's items may need to be changed or set when the wireless device is purchased, e.g. the mobile directory number needs to be set. The sales representative of the wireless device must then learn to operate all the user interfaces from all the different manufacturers and often must attach the wireless device to another computing device.

Many problems with wireless devices experienced by end-users may be traced to incorrect settings of these persistent storage data items. If a user of a wireless device experiences connectivity and/or operational problems, then often the solution requires the user to bring or mail the wireless device to a service center for a diagnostic analysis and the corresponding correction of the persistent storage item(s).

Such a requirement is often burdensome for users, and it does not allow the manufacturers, network service providers, or the developers of software to easily change the persistent storage items. This can be a very serious problem as the values in the persistent storage items may need to change to reflect changes that have occurred in the service providers' networks, either in the software or the hardware. Additionally, the service providers may find more optimal setting for the wireless devices, but are unable to load the settings onto the wireless devices without great effort. Further, this lack of flexibility may make it very difficult for the software developers to modify their software for wireless devices that have already been sold.

Additionally, wireless devices with incorrect persistent storage item settings may affect the operation of other wireless devices and/or the wireless network. As such, a problem experienced by one end user may be compounded and affect the user satisfaction of many users, as well as cause operational problems for the wireless network service providers.

Updating the persistent storage items can be difficult as often the values of the persistent storage items are copied into a memory having a different speed than the original memory, or other items are derived from values of the persistent storage item when the wireless device is started or re-started or when software is installed on the wireless device.

Further, some wireless devices allow the user of the wireless device to modify the persistent storage data without entering a password. This can result in persistent storage items being set so that the wireless device can no longer communicate with the network or it can make it very difficult to troubleshoot the problem with the wireless device. Further, some wireless devices allow service people or programs to access confidential persistent storage items on a wireless device such as the personal telephone directory of the user without entering a password.

Thus, improved apparatus and methods are desired to service the connectivity and operational performance of wireless devices on a wireless network relating to the persistent storage items.

BRIEF SUMMARY

To address one or more of the drawbacks of the prior art, the disclosed embodiments provide apparatus and methods for remote service programming of a wireless device on a wireless network.

In one aspect, a wireless communication device comprises a computer platform having a persistent storage comprising a plurality of persistent storage items each corresponding to a characteristic of the wireless device. Additionally, the wireless communication device further comprises a service programming module operable to perform an activity on a user-selectable one of the plurality of persistent storage items based on a predetermined persistent storage configuration.

In another aspect, a method of managing persistent storage items on a wireless device comprises obtaining a persistent storage configuration identifying a predetermined activity and a user-selectable one of a plurality of persistent storage items on the wireless device upon which to perform the activity. The method further includes executing the activity on the user-selectable one of the plurality of persistent storage items. Additionally, the method includes forwarding the result of executing the activity on the user-selectable one of the plurality of persistent storage items. In a related aspect, a wireless communications device comprises means for performing the respective above-defined operations. In another related aspect, a machine-readable medium comprises instructions which, when executed by a machine, cause the machine to perform the above-defined operations. In yet another related aspect, at least one processor may be configured to perform the above-defined operations.

In other aspects, an apparatus for managing the persistent storage items on a wireless device comprises a service programming module comprising service programming logic operable to generate and transmit a persistent storage configuration to a predetermined wireless device. The persistent storage configuration comprises a user-selectable activity to perform on a user-selectable one of a plurality of persistent storage items associated the predetermined wireless device. The apparatus also includes an information repository comprising activity results received by the apparatus based on an execution of the persistent storage configuration by the wireless device. Additionally, the apparatus includes an analyzer module operable to generate a report based on the activity results.

In further aspects, a method of managing persistent storage items in a wireless device, comprises generating a persistent storage configuration comprising a user-selectable activity to be performed on a user-selectable one of a plurality of persistent storage items associated with a predetermined wireless device. The method also includes forwarding the persistent storage configuration to the predetermined wireless device, and receiving the results of an execution of the persistent storage configuration by the predetermined wireless device with respect to the user-selectable one of the plurality of persistent storage items. Additionally, the method includes generating a report based on the received results. In a related aspect, an apparatus comprises means for performing the respective above-defined operations. In another related aspect, a machine-readable medium comprises instructions which, when executed by a machine, cause the machine to perform the above-defined operations. In yet another related aspect, at least one processor may be configured to perform the above-defined operations.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Figure 1:
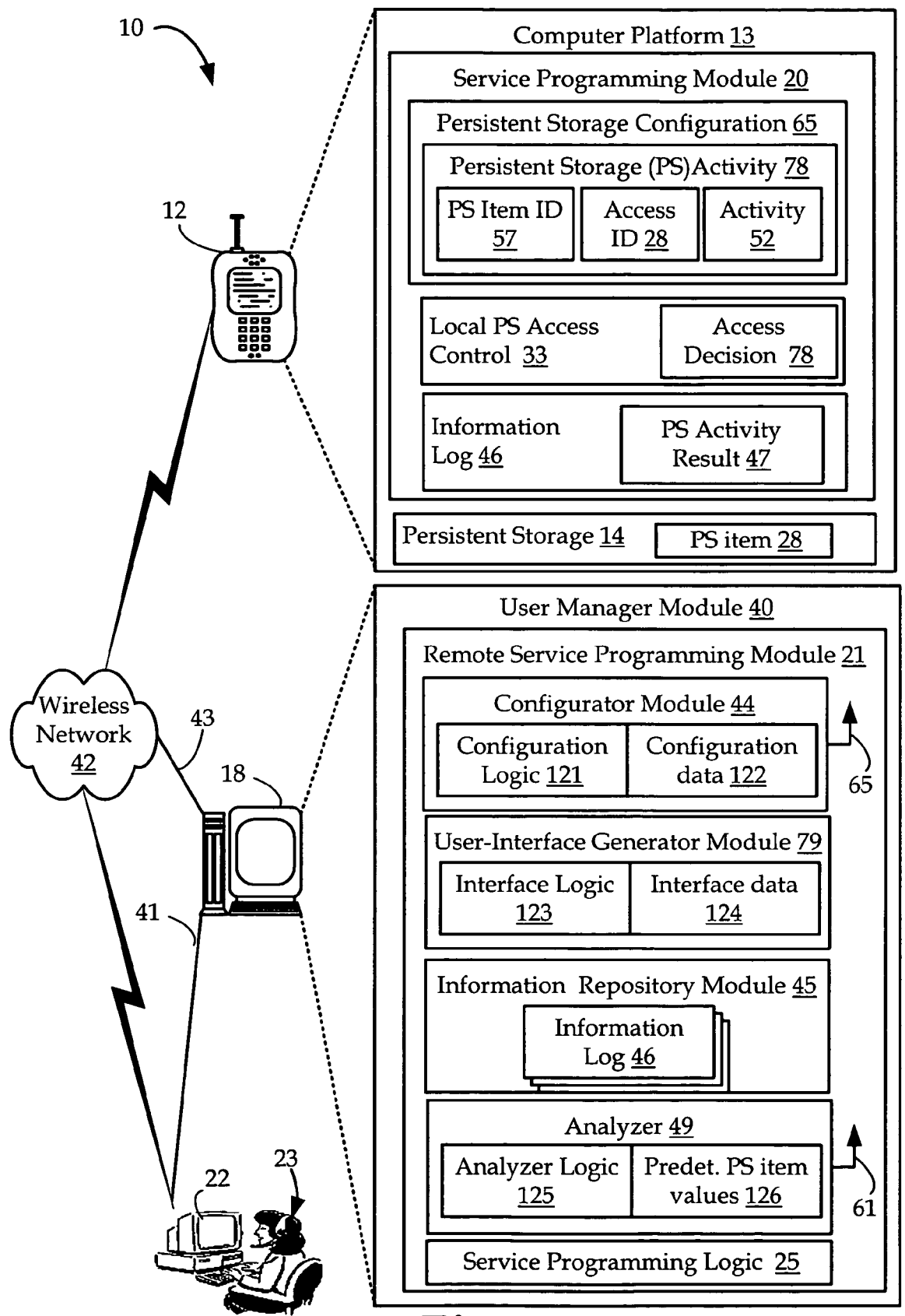
FIG. 1 is a schematic diagram of one embodiment of a system for retrieving and/or changing persistent storage items on the wireless device.
Figure 2:
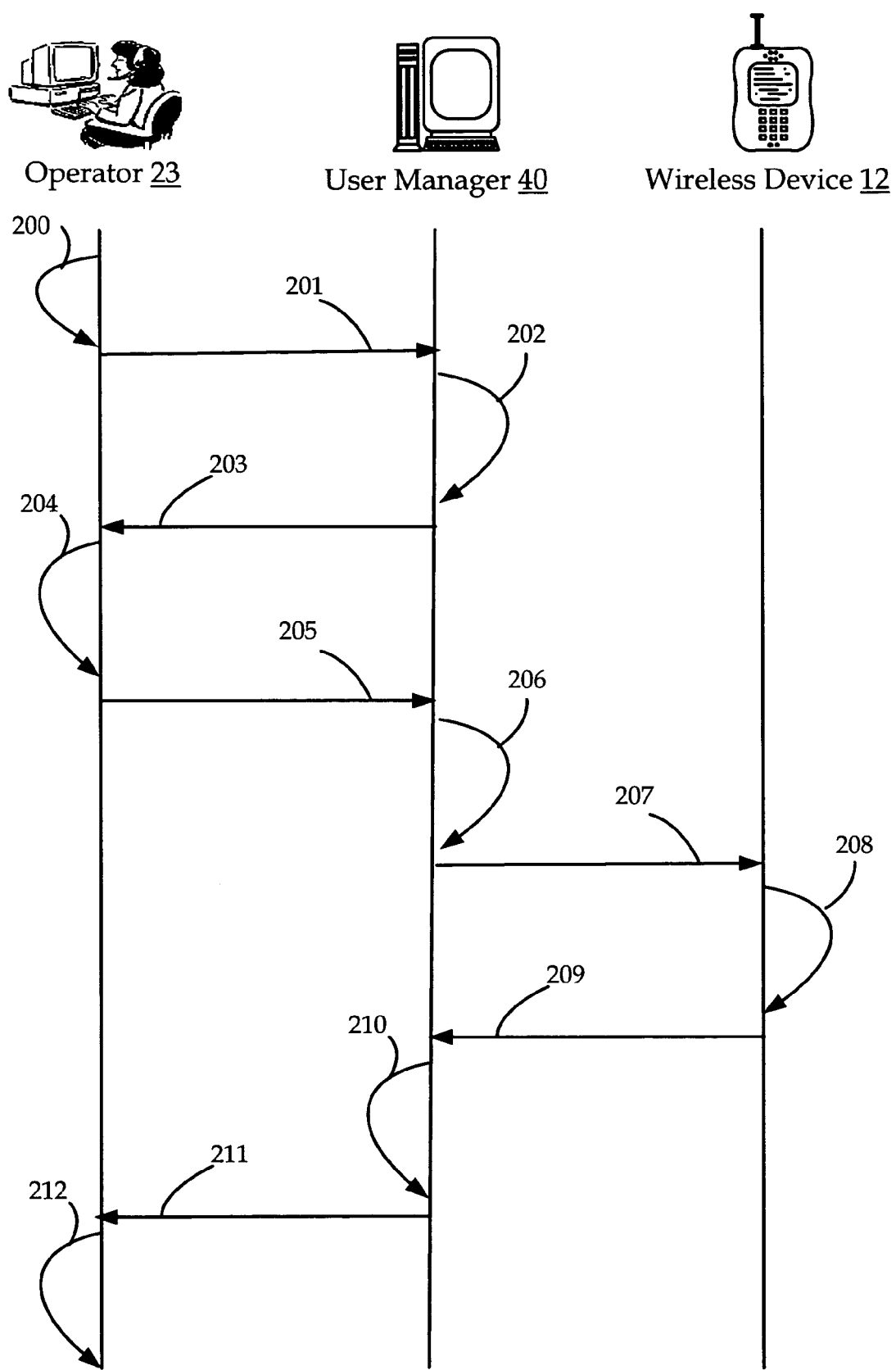
FIG. 2 is a message flow diagram associated with one embodiment of an operation of the system of FIG. 1.

FIG. 1 illustrates one embodiment of a wireless device service programming system 10 for setting and retrieving items in persistent storage (PS) 14, including a wireless device 12 having a resident service programming module 20 that sets or retrieves a user-selectable one of a plurality of persistent storage items 28 in persistent storage 14 based on a user-definable persistent storage configuration 65. FIG. 2 is a message flow diagram associated with one embodiment of a process performed by an operator 23, which may be a person or apparatus, in retrieving a persistent storage item 28 in persistent storage 14 of the wireless device 12 of FIG. 1. Referring to FIGS. 1 and 2, in one embodiment, the operator 23 resides on a wireless network help computer 22 connected in a wired connection 41 and/or via wireless network 42 to a user manager computer device 18. In this scenario, the operator 23 decides to set or retrieve an item 28 from persistent storage 14 of wireless device 12 (Event 200). The decision to set or retrieve an item from persistent storage 14 may be initiated in many ways. For example, the user of the wireless device 12 may have complained about a device performance problem, such as power being drained too quickly from their wireless device, and the operator accesses the persistent storage to investigate the problem. In other scenarios, an item from persistent storage 14 of wireless device 12 may be set or retrieved as part of a regular maintenance check or as an upgrade to the item value.

In the next step, the wireless network help computer 22 utilized by the operator 23 initiates user manager module 40 to interface with the wireless device (Event 201). The user manager module 40 may be resident on computer device 18, such as a server, located across wireless network 42 from operator 23 and wireless device 12. In other embodiments, the user manger module 40 may reside on the wireless device 12 or on the wireless network help computer 22 of the operator 23. In still other embodiments, the operator 23 and the user manager 40 may reside on the wireless device 12.

The user manager module 40 executes a user-interface generator module 79 to generate a user-interface for the operator 23 (Event 202). In one embodiment, the user-interface is menu based; however, other embodiments may employ other types of interfaces such as icons or voice recognition. The user-interface is then transmitted across the wireless network 42 and/or the wired connection 41 to the operator 23 (Event 203). As will be discussed later, the user-interface may be consistent, i.e. having similar menu sequences and similar configurations within a menu, for different device characteristics such as software and hardware configurations, so that the user, the operator 23 in this case, does not need to learn different user-interfaces.

In the next step, the operator 23 inputs a persistent storage item identifier 57 and an associated activity 52 in a menu on the user interface (Event 204). Persistent storage item identifier 57 corresponds to a persistent storage item 28 in persistent storage 14, upon which the user desires to perform an operation. Activity 52 identifies the operation to be performed, such as a read and/or a write, and may further include a value associated with the operation, such as in the case of setting a persistent storage item value. In one example, the user interface may present a plurality of possible persistent storage items and activities from which the user may select. For example, in the case of the fast power drain complaint mentioned above, the operator may select the slot cycle index persistent storage item. The slot cycle index tells the wireless device 12 when to wake up and listen to paging. If the value for slot cycle index is too large, then the wireless device 12 may miss a call, and if the value for the slot cycle index is too short, then too much power will be used by the wireless device 12. Further, for example, in this scenario the operator may select a "read" activity 52. The operator 23 via computer 22 then transmits the selected persistent storage item identifier 57 and corresponding activity 52 to the user manager 40 (Event 205).

In the next step, the configurator module 44 generates a configuration 65 (Event 206) which comprises the selected persistent storage item identifier 57, an access ID 82, and activity 58 Access ID 82, for example, comprises a unique identifier associated with the operator 23 or with the computer device 22, which may be used to authenticate the user. The user manager 40 then transmits the configuration 65 to the wireless device (Event 207).

The wireless device 12 receives the configuration 65 and then local persistent storage access control 33 on the wireless device 12 processes the configuration 65 to make an access decision 81. In a scenario where the user is authenticated and where the user has proper access, then the service programming module 20 on wireless device 12 executes configuration 65 and carries out the specified activity with regard to the specified persistent storage item (Event 208). For example, the module 20 may record the persistent storage item activity result 47 for reporting purposes. In the above-described scenario, for example, module 20 executes and places the value of the slot cycle index in the information log 46, where the read slot cycle index value comprises the persistent storage item activity result 47. In some aspects, a copy of the persistent storage configuration 65 may also be recorded in the log 46, along with other relevant information, such as a name or identifier associated with the data. In other embodiments, the access decision 81 may be made by the user manager module 40, and in still other embodiments the local persistent storage access control 33 may further query the originator of the configuration 65 for additional access-related information, such as for a password, a key, a digital signature, a digital certificate, etc. Additionally, access may be provided to one or more portions of persistent storage 14 based on access ID 82. In this manner, for example, in the above-described scenario, operator 23 may be permitted to read the slot cycle index, but not be permitted to read the contents of the telephone book on the wireless device 12.

In the next step, the wireless device 12 transmits the information log 46 to the user manager module 40 (Event 209). In some aspects, the user manager module 40 utilizes the user-interface generator module 79 to generate a user interface including the log information (Event 210). In this aspect, the user interface is then transmitted to the computer 22 of the operator 23 via the wired connection 41 or the wireless network 42 (Event 211). The operator 23 then views the contents of the log, in this example the value of persistent storage item called slot cycle index, and can then determine whether or not the value is acceptable (Event 212). In other aspects, Event 210 may comprise analyzer module 49 executing to automatically evaluate the information within log, and to generate a report 61 with respect to the persistent storage item, such as to provide details as to whether or not the value is acceptable. In these aspects, Event 211 may comprise the forwarding of the report, while Event 212 may comprise the review and evaluation of the report by the operator.

Thus, the present apparatus, methods, computer-readable media and processors for the collection, analysis, reporting, and setting of items in persistent storage 14 of wireless devices 12. For example, in one embodiment, a predetermined standard for the values of the items in persistent storage 14 may be established for all the wireless devices 12 with a particular device or network parameter, such as an associated network service provider, a software configuration and/or a hardware configuration. All the relevant wireless devices 12 may then be set to the predetermined standard. Further, the described embodiments may provide a consistent user-interface for increasing the efficiency of retrieving and setting items in persistent storage 14 of in dissimilar wireless devices 12.

Figure 3:
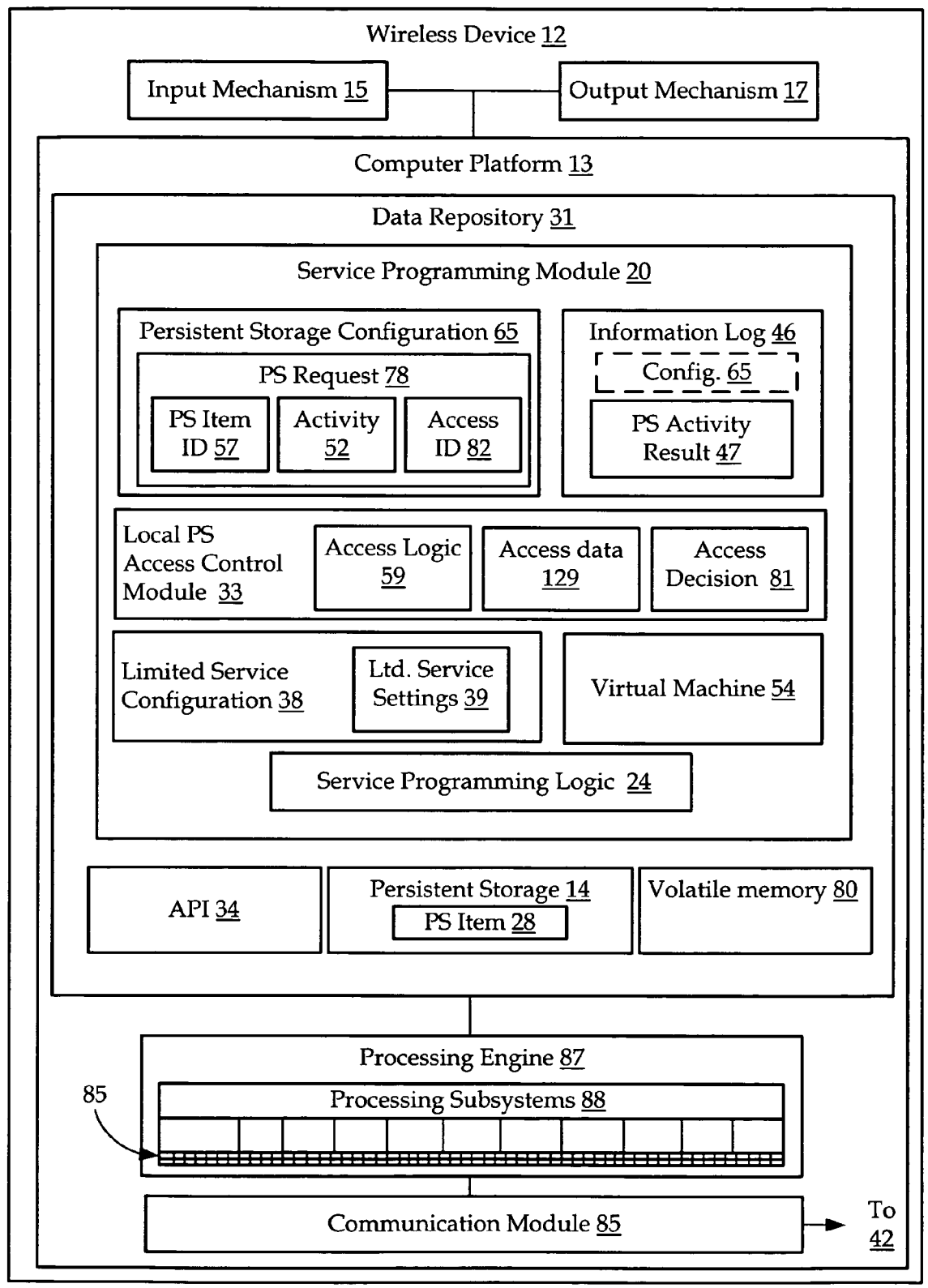
FIG. 3 is one embodiment of an architecture diagram of the wireless device of FIG. 1.

Referring to FIG. 3, wireless device 12 can include any type of computerized, wireless device 12, such as cellular telephone 12, personal digital assistant, two-way text pager, portable computer, and even a separate computer platform that has a wireless communications portal, and which also may have a wired connection to a network or the Internet. The wireless device 12 can be a remote-slave, or other device that does not have an end-user thereof but simply communicates data across the wireless network 42, such as remote sensors, diagnostic tools, data relays, and the like. The apparatus and method of service programming, i.e. retrieving, setting, and reporting on persistent storage items 28 of the wireless device can accordingly be performed on any form of wireless device or computer module, including a wired or wireless communication portal, including without limitation, wireless modems, PCMCIA cards, access terminals, personal computers, telephones, or any combination or sub-combination thereof.

Additionally, wireless device 12 has input mechanism 15 for generating inputs into wireless device, and output mechanism 17 for generating information for consumption by the user of the wireless device 12. For example, input mechanism 15 may include a mechanism such as a key or keyboard, a mouse, a touch-screen display, voice recognition module, etc. Further, for example, output mechanism 17 may include a display, an audio speaker, a haptic feedback mechanism, etc.

Further, wireless device 12 has computer platform 13 that can transmit data across wireless network 42, and that can receive and execute software applications and display data transmitted from user manager module 40 or another computer device connected to wireless network 42. Computer platform 13 includes a data repository 31, which may comprise volatile memory, such as random-access memory (RAM), and long-term memory defined by persistent storage (PS) 14, such as non-volatile memory (NVM), embedded file system (EFS), secure file system (SFS), read-only (ROM), erasable programmable ROM (EPROM), electronically-erasable ROM (EEPROM), flash cards and/or any memory common to computer platforms. Further, data repository 31 and persistent storage 14 may include one or more flash memory cells, or may be any secondary or tertiary storage device, such as magnetic media, optical media, tape, or soft or hard disk. In another embodiment, the wireless device 12 retrieves persistent storage 14 from across a wireless network 42. In other words, persistent storage 14 may comprise any long-term storage mechanism or storage mechanism capable of retaining data in a non-powered state.

Persistent storage items 28 are items of data, settings, profiles and/or variables of any type associated with a characteristic, an operational parameter, functionality and/or service programming parameter of the wireless device 12. Persistent storage items 28 may include, but are not limited to: electronic serial number (ESN), preferred roaming list (PRL), slot cycle index, mobile directory number (MDN), communication protocol-related transmit and receive settings; air interface settings; authentication settings; user identifications, passwords, and certifications; subscription settings; battery and/or charger settings; device application functionality settings, such as text messaging settings, media player settings, group call settings, position-location determination settings, language-based settings, web browser settings, camera-related settings, device mode settings and operating system settings; call management settings; and phonebook entries.

Persistent storage items 28 are stored in persistent storage 14, but the wireless device 12 may copy the persistent storage items 28 into volatile memory 80 such as random access memory (RAM). This may be done as the time for the processing engine 87 to retrieve an item from persistent storage 14, the access time, may be greater than the time for the processing engine 87 to retrieve an item from volatile memory 80, such as RAM. This may create a situation where in order to update the persistent storage items 28, either the wireless device 12 will have to be reset or a single persistent storage item 28 will have to be changed in both volatile 80 and nonvolatile memory 14. This will be discussed again in reference to a virtual machine 54 residing on the wireless device 12.

Further, computer platform 13 also includes at least one processing engine 87, which may be an application-specific integrated circuit ("ASIC"), or other chipset, processor, logic circuit, or other data processing device. Processing engine 87 or other processor such as ASIC may execute an application programming interface ("API") layer 34 that interfaces with any resident programs, such as service programming module 20, in a data repository 31 of the wireless device 12. API 34 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 87 includes various processing subsystems 88 embodied in hardware, firmware, software, and combinations thereof, that enable the functionality of wireless device 12 and the operability of the wireless device on wireless network 42. For example, processing subsystems 88 allow for initiating and maintaining communications, and exchanging data, with other networked devices. In one embodiment, such as in a cellular telephone, communications processing engine 87 may include one or a combination of processing subsystems 88, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed embodiments, processing subsystems 88 of processing engine 87 may include any subsystem components that interact with applications executing on computer platform 13. For example, processing subsystems 88 may include any subsystem components which receive data reads and data writes from API 34 on behalf of the resident service programming module 20. Further, all or portions of the persistent storage item activity result 47 that is gathered and then logged in the information log 46 is available from these subsystems 88.

Computer platform 13 further includes programming service module 20 to manage persistent storage items 28 on wireless device 12. Programming service module 20 may include any hardware, software, firmware and/or other set of executable instructions operable to manage the reading and writing of persistent storage items 28 on the wireless device 12, and the transmission across the wireless network 42 of any information, i.e. persistent storage activity result 47, relating to the management of persistent storage items 28 of the wireless device 12. In one embodiment, service programming module 20 includes service programming logic 24 that provides the capability for retrieving, transmitting, setting, and storing of items in persistent storage 14 of wireless device 12 based on persistent storage configuration 65.

Service programming module 20 may be initiated at any time, and persistent storage activity result 47 logged in the information log 46 may be stored on the wireless device 12 and obtained at any time via a wired or wireless connection to the wireless device 12. Further, service programming module 20 may store this information in an information log 46, either in data repository 31 or another memory device connectable to the wireless device 12. Information log 46 may include any type of memory or storage device. Although illustrated as being associated with service programming module 20, information log 46 may be located anywhere in communication with service programming module 20, such as on another server or computer device connected to wireless network 42, on wireless device 12 or on a wireless network help computer 22.

Service programming module 20 may cause the wireless device 12 to selectively transmit the value of selected persistent storage items 28 for that wireless device 12 to another computer device, such as user manager module 40, over the wireless network 42. In one embodiment, service programming module 20 transmits collected persistent storage items 28 from that wireless device 12 to user manager module 40 across the wireless network 42. Alternatively, persistent storage items 28 are transmitted over an open communication connection from the wireless device 12 over the wireless network 42 to user manager module 40 and thus "piggy-backed" across an open connection, such as a voice or data call at the wireless device 12. In a cellular network configuration, persistent storage items 28 can be transmitted to user manager module 40 through short message service, file transfer protocol, hypertext transfer protocol, etc. In another embodiment, user manager module 40 reads persistent storage items 28 from the respective device through a remotely-located service programming module 21. Accordingly, access to service programming module 20 allows the user manager module 40 to remotely retrieve and set values for persistent storage items 28.

Service programming module 20 operates based on persistent storage configuration 65. Persistent storage configuration 65 may be generated by any computer device connected to wireless network 42, or may be locally transmitted to the wireless device 12 such as by a manual input from a user, and/or through transmission from a locally-connected media reader, or may even have been loaded on the wireless device 12 at the time of manufacture. In one embodiment, for example, persistent storage configuration 65 is generated by the user manager module 40 as explained below.

Persistent storage configuration 65 may include instructions and data which specify operations to be performed by service programming module 20. Persistent storage configuration 65 may be completely configurable, i.e. the defined activities and persistent storage items may be user selected and/or determined, and thus these defined parameters may take on a nearly unlimited variety and form. For example, continuing to refer to FIG. 3, in one embodiment, persistent storage configuration 65 may contain persistent storage request 78, which is comprised of persistent storage item identifier 57, activity 52, and access ID 82. The persistent storage item identifier 57 identifies a user-selected one of a plurality of persistent storage item 28 on the wireless device 12 to which the activity 52 refers. The activity 52 identifies a user-defined and configurable operation to perform, such as a read and/or write, and/or a value to add in the case of a write, with respect to the identified persistent storage item. And, access ID 82, which may be optional, refers to an identity of the party requesting the activity 52. For example, persistent storage item identifier 57 may be the persistent storage item 28 called slot cycle index, and activity 52 may be for the service programming module 20 to read the value of slot cycle index and place the value in the information log 46 and transmit it to the user manager module 40. More generally, the activity 52 may be for retrieving or changing the value of persistent storage item identifier 57, and may include instructions and data for the service programming module 20 to perform on a virtual machine 54, such as a JAVA® run time environment. The instructions and data may be a general purpose program, such as JAVA®programming language, that are to be run on virtual machine 54 in order to retrieve or change the value of persistent storage item identifier 57. The functionality enabled by the instructions and data contained in the activity 52 is described below with the description of the virtual machine 54. The access ID 82 which may be contained in persistent storage request 78 enables the service programming module 20 to control access to the persistent storage items 28 based on the persistent storage request 78. This will be described later with the description of the local persistent storage access control module 33. Thus, persistent storage configuration 65 provides a flexible means for controlling the operation of the service programming module 20.

As noted above, service programming module 20 may include virtual machine 54 where the virtual machine 54 may be operable to execute the instructions and data contained in activity 52 that may be a general purpose programming language such as JAVA® code. In one embodiment, the general purpose programming language may operate any functionality of the respective wireless device 12. For example, the virtual machine 54 may conduct an actual call on the wireless device 12 to gather information to use for retrieving or changing a persistent storage item 28. In other embodiments, the instructions and data contained in activity 52 may be a relatively simpler language. Further, the instructions and data contained in the activity 52 provide for functionality such as the ability to retrieve or change the persistent storage item identifier 57 from both persistent storage 14 and volatile memory 80. This ability allows a persistent storage item identifier 57 which has been copied to volatile memory 80 to be changed without the necessity of restarting the wireless device 12. As was discussed earlier, a persistent storage item 28 may be copied to volatile memory 80 so that the access time for the processing engine 87 to retrieve it will be less than if the item remained only in persistent storage. For example, volatile memory 80 may have an access time which is faster than the corresponding access time to persistent storage 14. In another embodiment, the instructions and data contained in the activity 52 may be an executable program that calculates a value for the persistent storage item 28 prior to setting the persistent storage item 28. In this case, the value for the persistent storage item 28 may be a function of some other known value. For example, if the persistent storage item identifier 57 were slot cycle index, activity 52 may contain a program and data that calculates the speed of the processing engine 87 and then uses this value to derive a value to which to set the slot cycle index. Further, it should be noted that virtual machine 54 may alternately or in addition comprise an extensible markup language (XML) processor in combination with received scripts that are received and processed to perform any predetermined functionality, as discussed above, on the wireless device. Thus the virtual machine 54 provides for the ability to change or retrieve persistent storage items 28 by using instructions and data contained in activity 52 that may perform any operation on the wireless device 12.

Continuing to refer to FIG. 3, in some embodiments the persistent storage configuration 65 is examined by a local persistent storage access control module 33 that includes access logic 59 which is executable by local access control module 40 to make an access decisions 81 by either permitting or denying an activity 52 on an persistent storage item 28, for example, based on activity 52 and/or based on the access ID 82. Additionally, access logic 59 may further include algorithms, decision-making routines, encryption algorithms, etc. for making access decisions 81, and for transmitting, storing and encrypting/decrypting a password, digital signature, digital certificate, key, etc. The access logic 59 may utilize access data 129, which in one embodiment may be a data base that contains collections of the possible users of the wireless device 12, all or some portion of the persistent storage items 28 on the wireless device 12, all or some portion of the possible activities 52 for each persistent storage item 28, and the authorized access IDs 82, along with access permissions for combinations of these items. For example, for persistent storage item 28 such as slot cycle index, the access data 129 may contain information that identifies a predetermined operator 23, as identified by access ID 82, as being authorized to change the value of the slot index cycle with a predetermined password. The access ID 82 contains such information as individual user ids, passwords, user types, and other such information that may be useful in making access decisions 81 for persistent storage items 28 on a wireless device 12. Further, local persistent storage access control module 33 enables any predetermined functionality, such as: denying a predetermined party, such as carrier operator 23, access to a predetermined portion of the storage, such as storage of personal user information such as a telephone book of a user of a wireless device 12; and preventing a user of a wireless device 12 from changing predetermined persistent storage item 28 that may affect device and/or network operations, such as a persistent storage item 28 that when improperly set would prevent further access to the wireless network 42. In one embodiment the local persistent storage access control module 33 may request and verify a password or other access-related mechanisms before permitting an activity 52 on a persistent storage item 28. Further, there may be different passwords or access mechanisms for different persistent storage items 28. So, for example, a persistent storage item 28 associated with a local telephone book may have a different password than a persistent storage item 28 that affects the operation of the wireless device 12. Local persistent storage access control module 33 may include hardware, software, firmware, and combinations thereof for making access decisions 81. Although illustrated as being associated with service programming module 20, local persistent storage access control module 33 may be located anywhere in communication with wireless network 42, such as on user manager module 40, another server connected to the network, on a wireless device 12 or on an operator computer 22. Thus the local access control module 33 provides for the functionality of protecting the persistent storage items 28 on the wireless device 12 from either being inappropriately retrieved, e.g. a private phonebook, or inappropriately changed, e.g. a user accidentally changing a persistent storage item 28 that would affect the operation of the wireless device 12. Further, in protecting the persistent storage items 28 the local access control module 33 may be useful in preventing intentional intrusions to the wireless device 12, for example, probes by a hacker and/or access attempts from a virus.

Further, service programming module 20 may include a limited service configuration 38 operable to establish a limited-access communications channel across the wireless network 42. In some aspects, limited-access communications channel may not be available to the end user of wireless device 12. For example, the limited-access communications channel may be used for transmitting information log 46 or for receiving persistent storage configuration 65. Further, in the case when communications from wireless device 12 have otherwise been disabled, the limited-access communications channel may allow emergency calls, such as "911" calls, or may allow calls to an operator or other designated party associated with the wireless network provider. Such a limited service channel may be useful in scenarios where a change has been made to persistent storage item 28 that disables the communication ability of the wireless device, and the limited service channel may be used to gain access to the wireless device and read and/or write values to restore the functionality of the device. Additionally, the identification and set-up of the limited-access communications channel is based on a limited service setting 39. Data service setting 39 may identify the type of communications that are allowed, and may identify the associated communication channels that can be utilized. Data service configuration 38 may be received over the wireless network 42, may be locally transferred to wireless device 12, such as through a serial connection, or may be preloaded on the wireless device 12.

Thus, in one embodiment, programming service module 20 provides wireless device 12 with a resident or self-contained capability for retrieving, changing, and storing persistent storage items 28.

Referring back to FIG. 1, user manager module 40 may comprise at least one of any type of hardware, software, firmware, server, personal computer, mini computer, mainframe computer, or any computing device either special purpose or general computing device. Further, user manager module 40 may reside entirely on the wireless device 12. Further, there can be separate servers or computer devices associated with user manager module 40 that work in concert to provide data in usable formats to parties, and/or to provide a separate layer of control in the data flow between the wireless devices 12 and user manager module 40. User manager module 40 (or plurality of modules) can send software agents or applications, such as the service programming module 20, to wireless device 12 across wireless network 42, such that the wireless device 12 returns information from its resident applications and subsystems. For example, wireless devices 12 may transmit the result, i.e. persistent storage activity result 47 and the associated configuration 65, of applying configuration 65 to persistent storage items 28 within an information log 46, where the user manager module 40 may then compare this result with predetermined persistent storage values 126 to generate report 61. For example, a predetermined persistent storage value 126 may be a predetermined value and/or range of values corresponding to a proper, authorized and/or predetermined standard setting of the given persistent storage item 28. Predetermined persistent storage values 126 may vary depending on many factors, such as the make or model of the wireless device, the hardware and/or software configuration, the communications protocol being used, the associated network carrier, etc.

User manager 40 includes remote service programming module 21 to manage persistent storage items 28. Remote service programming module 21 may include software, hardware, firmware, and generally any executable instructions operable by user manager module 40. Remote service programming module 21 may download all or a portion of the resident version of service programming module 20 to a wireless device 12. Alternatively, the resident version of remote service programming module may be loaded onto the wireless device 12 during the initial assembly process or via direct connections during a configuration process. Further, remote service programming module 21 includes service programming logic 25 which is executable by user manager module 40 to generate persistent storage configuration 65 and to manage the collection and analysis of information log 46 from wireless devices 12. Remote service programming module 21 may "pull" the log 46 based on commands from a user, or the log may be "pushed" from the wireless devices 12.

Figure 4:
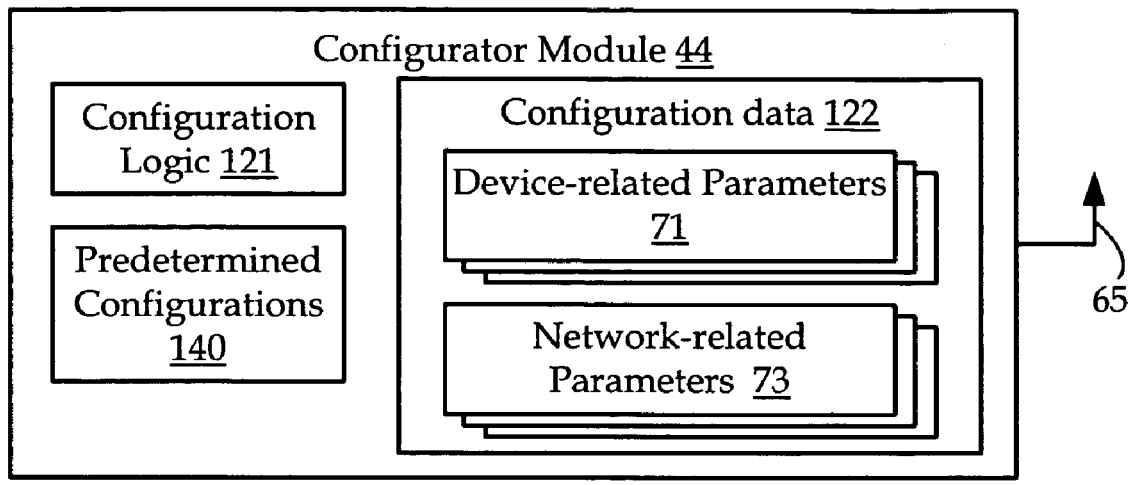
FIG. 4 is another embodiment of the configurator module of FIG. 1.

Referring to FIGS. 1 and 4, in one embodiment, remote service programming module 21 includes configurator module 44 that includes hardware, firmware, software and/or any other associated logic that allows the configurator module 44 to generate persistent storage configuration 65. In one embodiment, configurator module 44 executes configuration logic 121 which assembles the various components of a given persistent storage configuration 65, which in some aspects may be based on making selections from a number of variable parameters. For example, the parameters that make up persistent storage configuration 65 may vary depending on device-related parameters 71 and/or network-related parameters 73. For example, device-related parameters 71 may include, but are not limited to: the type/make/model/manufacturer of the wireless device; the hardware configurations and/or versions; the communications protocol; and the software configurations and/or versions. Further, for example, network-related parameters 73 may include, but are not limited to: the network service provider associated with the wireless device; and the communications protocol used. It should be noted, however, that device-related parameters 71 and/or network related parameters 73 may include any other predetermined factors. For example, the configuration logic 121 may make use of configuration data 122 which in one embodiment may be a data base that contains a plurality of possible software configurations, a plurality of the possible processing engines, a plurality of possible different languages, and a plurality of different carriers, among other possible data. The configuration logic 121 uses the configuration data 124 in order to aid in the generation of a configuration driven by a user. Further, referring to FIG. 5, configurator module 44 is operable to operate with a user-interface generator module 79 to provide a consistent user interface 87, as will be discussed in more detail below. Alternatively, rather than selecting the various parameters individually, configuration logic 121 may provide the ability to select from a plurality of predetermined persistent storage configurations 140. This functionality allows for all or a subset of persistent storage items 28 on a wireless device 12 to be set to a standard. Once persistent storage configuration 65 is generated, configurator module 44 and/or remote service programming module 21 is operable to transmit persistent storage configuration 65 to one or more wireless devices 12 in order to initiate the predetermined persistent storage activity 52.

Figure 5:
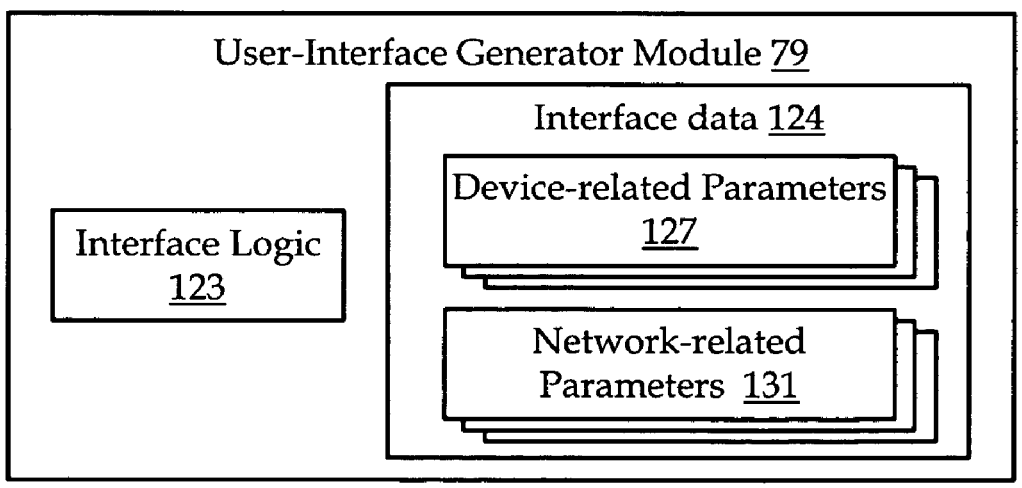
FIG. 5 is another embodiment of the user-interface generator module of FIG. 1.
Figure 6:
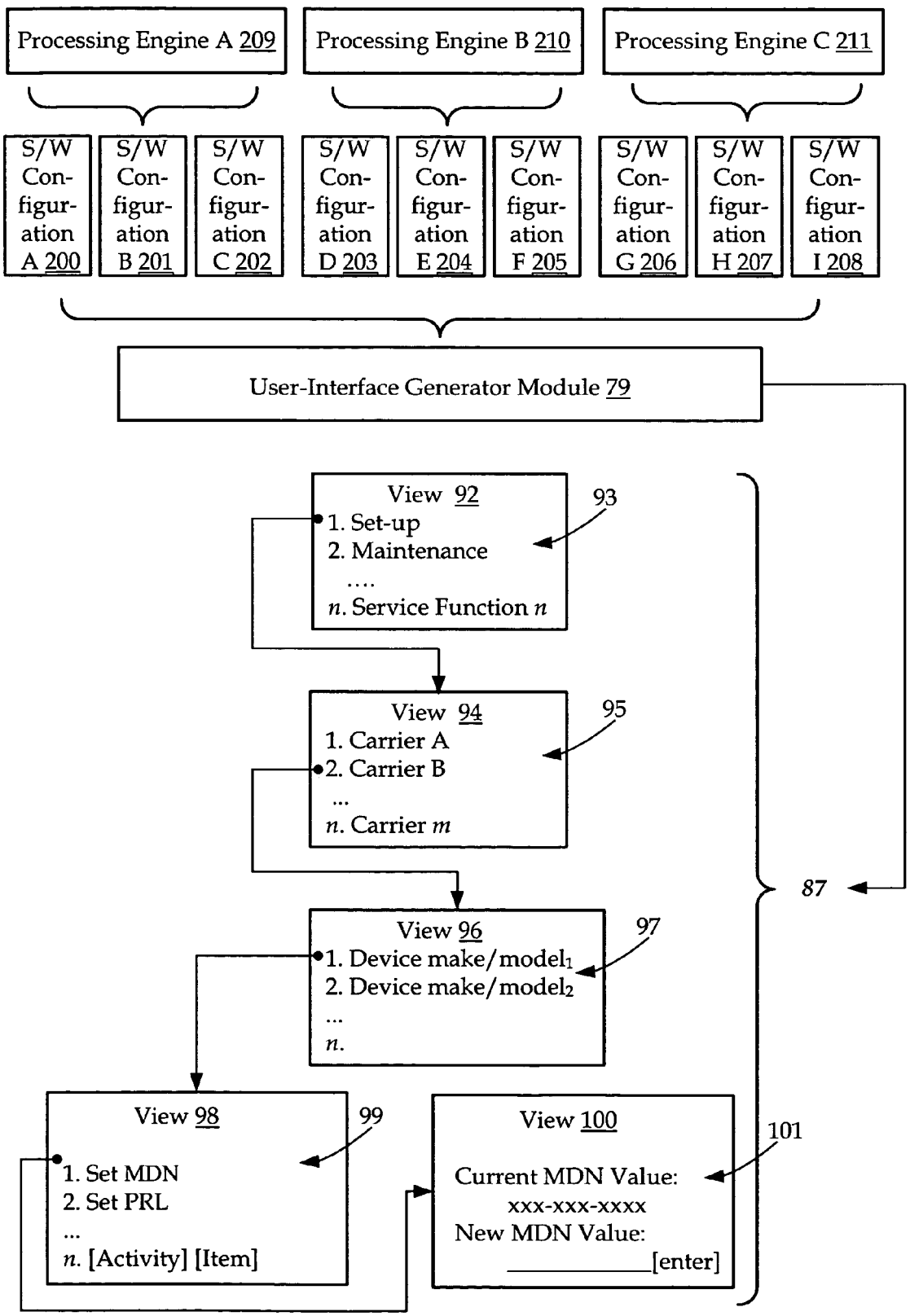
FIG. 6 is a representative diagram of a one embodiment of the interaction between a programming service module of the apparatus of FIG. 1 and a user.

Further, referring to FIGS. 1, 5, and 6, as introduced earlier, remote service programming module 21 may have a user-interface generator module 79. User-interface generator module 79 includes interface logic 123 which is executable by user-interface generator module 79 to provide for a consistent user interface 87 (FIG. 6) for use in programming persistent storage items in different types of wireless devices and/or in wireless devices associated with different networks. For example, referring to FIG. 6, the process for accessing persistent storage items for wireless devices having different processing engines 209, 210, 211 and different software ("S/W") configurations 200, 201, 202, 203, 204, 205, 206, 207, 208 may be integrated by user interface generator module 79 into a consistently ordered sequence of menus 87, represented by views 92, 94, 96, 98 and 100, each having consistently ordered arrangements 93, 95, 97, 99, 101 of inputs and/or outputs, such as menu selections and/or value entry locations. Interface logic 123 may include algorithms, decision-making routines, encryption algorithms, etc. for generating a consistent sequence of user interfaces 87, and for transmitting, storing and optionally encrypting the consistent user interface 87. The user interface 87 may be generated for a user who is a person or may be generated for an apparatus. The user interface 87 generated may be in a graphical form or may be in form easier for a computer apparatus to interpret, such as extensible mark-up language (XML). The interface logic 123 may comprise interface data 124 in order to generate the consistent user interface 87 for the user. For example, interface data 124 may include device-related parameters 127 and/or network-related parameters 131. For example, device-related parameters 127 may include, but are not limited to: the type/make/model/manufacturer of the wireless device; the hardware configurations and/or versions; the communications protocol; and the software configurations and/or versions. Further, for example, network-related parameters 131 may include, but are not limited to: the network service provider associated with the wireless device; and the communications protocol used. It should be noted, however, that device-related parameters 127 and/or network-related parameters 131 may include any other predetermined factors. For example, in one embodiment, interface data 124 may comprise a data base that contains a plurality of the possible software configurations, plurality of the possible processing engines, a plurality of possible different languages, a plurality of possible device manufacturers, a plurality of possible device models, and a plurality of possible carriers. The interface logic 123 uses the interface data 124 to sort through all of the variables and assemble an ordered user interface with the appropriate data corresponding to the parameters associated with a given wireless device. User-interface generator module 79 may include hardware, software, firmware, and combinations thereof to generate consistent user interface 87. Although the user interface generator module 79 is illustrated as being associated with the remote service programming module 21, it may be located anywhere in communication with the wireless network 42 such as on user manager module 40, on the service programming module 20, another server connected to the network, on a respective wireless device 12, or on a network help computer 22 accessible through the wireless network 42.

Referring back to FIG. 1, remote service programming module 21 may include information repository module 45 for storing information log 46 received from wireless device 12 based on executing persistent storage configuration 65. Information repository 45 may include any type of memory or storage device. Although illustrated as being associated with remote service programming module 21, information repository 45 may be located anywhere in communication with user manager 40, such as on another server or computer device connected to wireless network 42, on wireless device 12 or on a wireless network help computer 22.

Further, as noted above, remote service programming module 21 may include analyzer 49, which may include hardware, software, firmware, and combinations thereof for analyzing and processing the information relating to persistent storage activity result 47 in the information repository 45 in order to generate a report 61. Additionally, analyzer 49 may further include analysis logic 125 comprising algorithms, decision-making routines, statistical programs, etc. for analyzing and interpreting the information logs 46 contained in the information repository module 45. Although illustrated as being associated with remote service programming module 21, analyzer 49 may be located anywhere in communication with user manager module 40, on another server connected to wireless network 42, on wireless device 12 or on a wireless network help computer 22.

In one embodiment, report 61 and/or information log 46 may be reviewed manually, such as by a technician, field engineer, carrier, operator 23 or the user of the wireless device 12, for evaluation of the information relating to persistent storage activity result 47 associated with a particular wireless device 12. Operator 23 or the user of the wireless device 12 may generate a new persistent storage configuration 65, for the wireless device 12 based on the information log 46 and/or on the report 61. Generally, report 61 may be useful in detecting and correcting problems related to persistent storage item 28 values through analysis of information log 46. As such, report 61 includes any form of output that represents analysis of information log 46 and other information contained in the information repository 45, as well as any other associated information that may be incorporated in predetermined persistent storage values 126 such as reports of viruses, proper persistent storage values for the wireless device 12, etc. The generated report 61 may then be considered a measure of the integrity of the persistent storage items 28 on a wireless device 12.

Although illustrated as producing report 61, remote service programming module 21 and its corresponding components can give a ready view of the information relating to persistent storage activity result 47 collected from the wireless devices 12 in any form, such as tables, maps, graphics views, plain text, interactive programs or web pages, or any other display or presentation of the data. For example, remote service programming module 21 may present persistent storage item related information on a monitor or display device, and/or may transmit this information, such as via electronic mail, to another computer device for further analysis or review. Also, remote service programming module 21 may be executable to change persistent storage configuration 65 based on the information log 46 and/or based on the report 61 generated by analyzer 49.

As previously described in reference to FIG. 1, although operator 23 in this embodiment is illustrated as a person, in other embodiments operator 23 may be a computing device which may include hardware, software, firmware, and combinations thereof for analyzing and responding to report 61 or to an external communication such as from the user of the wireless device 12. Further, operator 23 may reside on the same computing device as the user manager module 40, which could be the wireless device 12. In one embodiment, operator 23 is a person that may respond to a report 61. Additionally, operator 23 may further include algorithms, decision-making routines, statistical programs, etc. for analyzing and interpreting report 61. Although illustrated as being associated with wireless network help computer 22, operator 23 may be located anywhere in communication with wireless network 42, such as on user manager module 40, another server connected to the network, or even on the wireless device 12.

Referring to FIG. 1, wireless network 42 includes any communications network operable, at least in part, for enabling wireless communications between wireless devices 12 and any other device connected to wireless network 42. Further, wireless network 42 may include all network components, and all connected devices that form the network. For example, wireless network 42 may include at least one, or any combination, of: a cellular telephone network; a terrestrial telephone network; a multicast network such as a Forward Link Only (FLO) network, such as the MediaFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association ("IrDA")-based network; a short-range wireless network; a Bluetooth® technology network; a ZigBee™ protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: Personal Communications Services, code division multiple access, wideband code division multiple access, universal mobile telecommunications system, advanced mobile phone service, time division multiple, access, frequency division multiple access, orthogonal frequency division multiple access, global system for mobile communications, analog and digital satellite systems, and any other technologies/protocols that may be used in at least one of a wireless communications network and a data communications network.

Network interface 43 may be any mechanism that allows user manager module 40 to communicate across wireless network 42. For example, network interface 43 may include a local area network that connects user manager module 40 through an Internet Service Provider to the Internet, which in turn may be connected to a respected wireless device through a carrier network and a base station.

Figure 7:
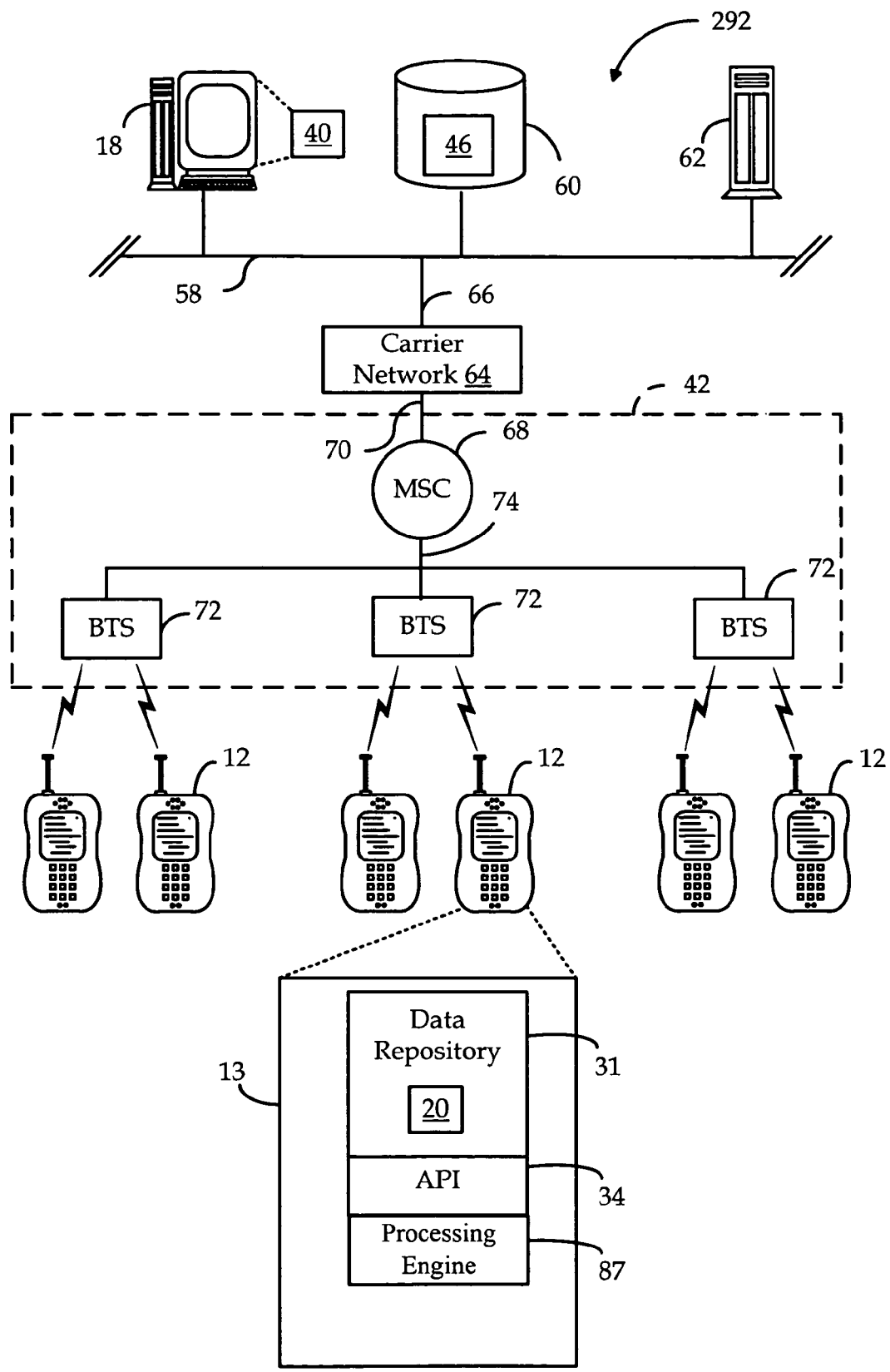
FIG. 7 is a schematic diagram of one embodiment of a cellular telephone network embodiment of FIG. 1.

FIG. 7 is a representative diagram that more fully illustrates the components of a cellular wireless network and the interrelation of the elements of one embodiment of the present system. In one embodiment, wireless device 12 comprises a cellular telephone. A cellular telephone system 292 may include wireless network 42 connected to a wired network 58 via a carrier network 64. Wireless devices 12 are being manufactured with increased computing capabilities and often can communicate packets including voice and data over wireless network 42. As described earlier, these "smart" wireless devices 12 have APIs 34 on their local computer platform 13 that allow software developers to create software applications that operate on the cellular telephone 12, and control certain functionality on the device. Cellular wireless network 292 is merely exemplary and can include any system whereby remote modules, such as wireless devices 12 communicate over-the-air between and among each other and/or between and among components of a wireless network 42, including, without limitation, wireless network carriers and/or servers.

In system 292, user manager module 40 can be in communication over a wired network 58 (e.g. a local area network, LAN) with a separate data repository 60 for service programming information, such as the data logs 46 gathered from the wireless devices 12 or interface data 124 or configuration data 122. Further, a data management server 62 may be in communication with user manager module 40 to provide post-processing capabilities, data flow control, etc. User manager module 40, data repository 60 and data management server 62 may be present on the cellular telephone system 292 with any other network components that are needed to provide cellular telecommunication services. User manager module 40, and/or data management server 62 communicate with carrier network 64 through a data links 70 and 66, which may be data links such as the Internet, a secure LAN, WAN, or other network. Carrier network 64 controls messages (generally being data packets) sent to a mobile switching center ("MSC") 68. Further, carrier network 64 communicates with MSC 68 by a network 70, such as the Internet, and/or POTS ("plain old telephone service"). Typically, in network 70, a network or Internet portion transfers data, and the POTS portion transfers voice information. MSC 68 may be connected to multiple base stations ("BTS") 72 by another network 74, such as a data network and/or Internet portion for data transfer and a POTS portion for voice information. BTS 72 ultimately broadcasts messages wirelessly to the wireless devices, such as wireless devices 12, by short messaging service ("SMS"), or other over-the-air methods.

Figure 8:
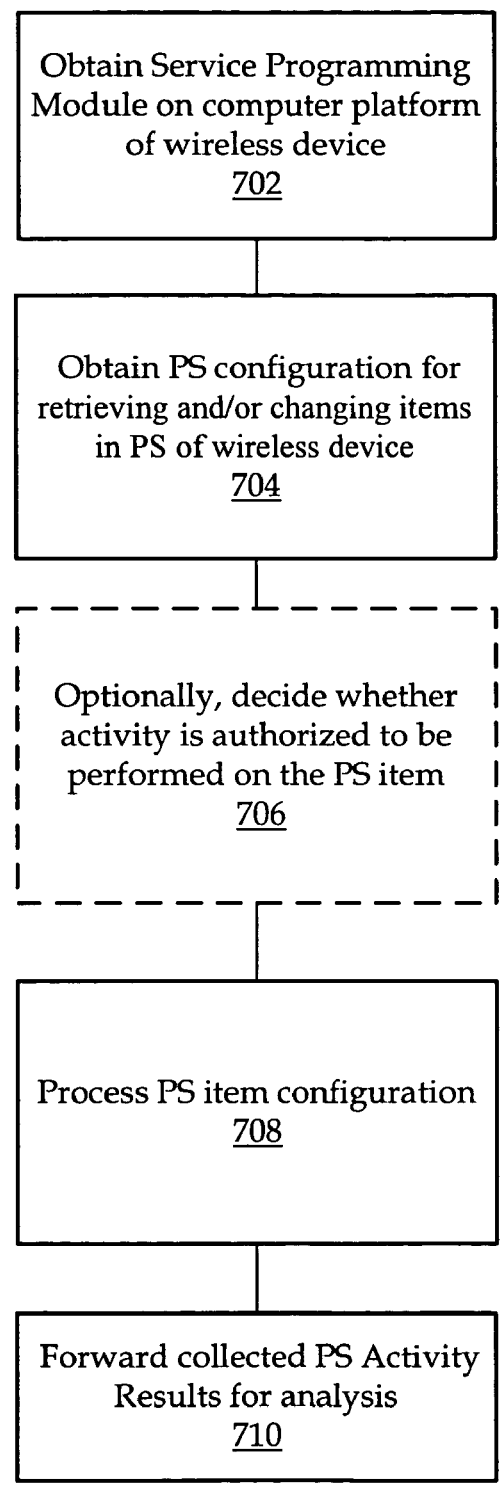
FIG. 8 is a flowchart of one embodiment of a method operable on a wireless device for retrieving and/or changing persistent storage items on the wireless device.

Referring to FIG. 8, one embodiment of a method for managing items in persistent storage 14 of wireless device 12 and providing a corresponding consistent user-interface includes obtaining at least a portion of a service programming module 20 for a computer platform 13 of a wireless device 12 (Block 702). For example, the service programming module 20 may be embodied within the hardware and/or firmware of the wireless device during the manufacture of the device. Alternatively, the service programming module 20 may be "pushed" by a user manager module 40 to the wireless device 12 or "pulled" from a user manager module 40 by the wireless device 12 across a wireless network 42. Alternatively, the service programming module 20 may be "pulled" or "pushed" depending on whether or not the wireless device 12 has the latest version of the service programming module 20 for the respective wireless device 12. In another alternative, loading of the service programming module 20 may be configurable in any manner, for example, being initiated by a predetermined event, such as the wireless device 12 having difficulty communicating with the wireless network 42, or the wireless device 12 communicating with a different network service provider. In another alternative, the pushing or pulling of the service programming module 20 to the wireless device 12 may be configurable in any manner, for example: being initiated by a predetermined event.

Further, this embodiment of the method includes obtaining at least a portion of a persistent storage configuration 65 for retrieving and setting items in persistent storage 14 of wireless device 12 (Block 704). For example, persistent storage configuration 65 may be embodied within the hardware and/ or firmware of the wireless device during the manufacture of the device. Alternatively, persistent storage configuration 65 may be "pushed" by a user manager module 40 to the wireless device 12, or "pulled" from a user manager module 40 by the wireless device 12, across a wireless network 42. In another alternative, obtaining the persistent storage configuration 65 may be initiated in any manner, for example, being initiated by a predetermined event, such as the wireless device 12 having difficulty communicating with the wireless network 42, or the wireless device 12 communicating with a different network service provider. In another alternative, the pushing or pulling of the configuration 65 to the wireless device 12 may be configurable in any manner, for example: being initiated by a predetermined event. Additionally, as noted above, the generation of the configuration may occur through use of a user interface generator module 79 which provides a consistent user interface 87 to the user.

Additionally, this embodiment of the method may include determining whether or not an activity called for by configuration 65 is authorized, such as based on access ID 82 from the user (Block 706). As discussed earlier the local persistent storage access control module 33 makes an access decision 78 and may request a password or other authorization mechanism from the user.

Further, this embodiment of the method includes processing the persistent storage configuration (Block 708). For example, service program module 20 carries out the activity called out by the configuration 65. For example, persistent storage item identifier 57 may be slot cycle index and activity 52 may be either to retrieve or set the value of slot cycle index. Further, the service programming logic 24 may write to the information log 46 the result of the requested activity, i.e. the information relating to persistent storage activity result 47.

Further, this embodiment of the method includes forwarding the persistent storage activity results 47 contained in the information log 46 to the user of the service programming module 20 (Block 710). As noted above, this information includes the activity performed to one or more persistent storage items, and may further include the configuration associated with the activity as well as any other device-related and/or network-related information that may be of interest to the party sending the configuration.

Figure 9:
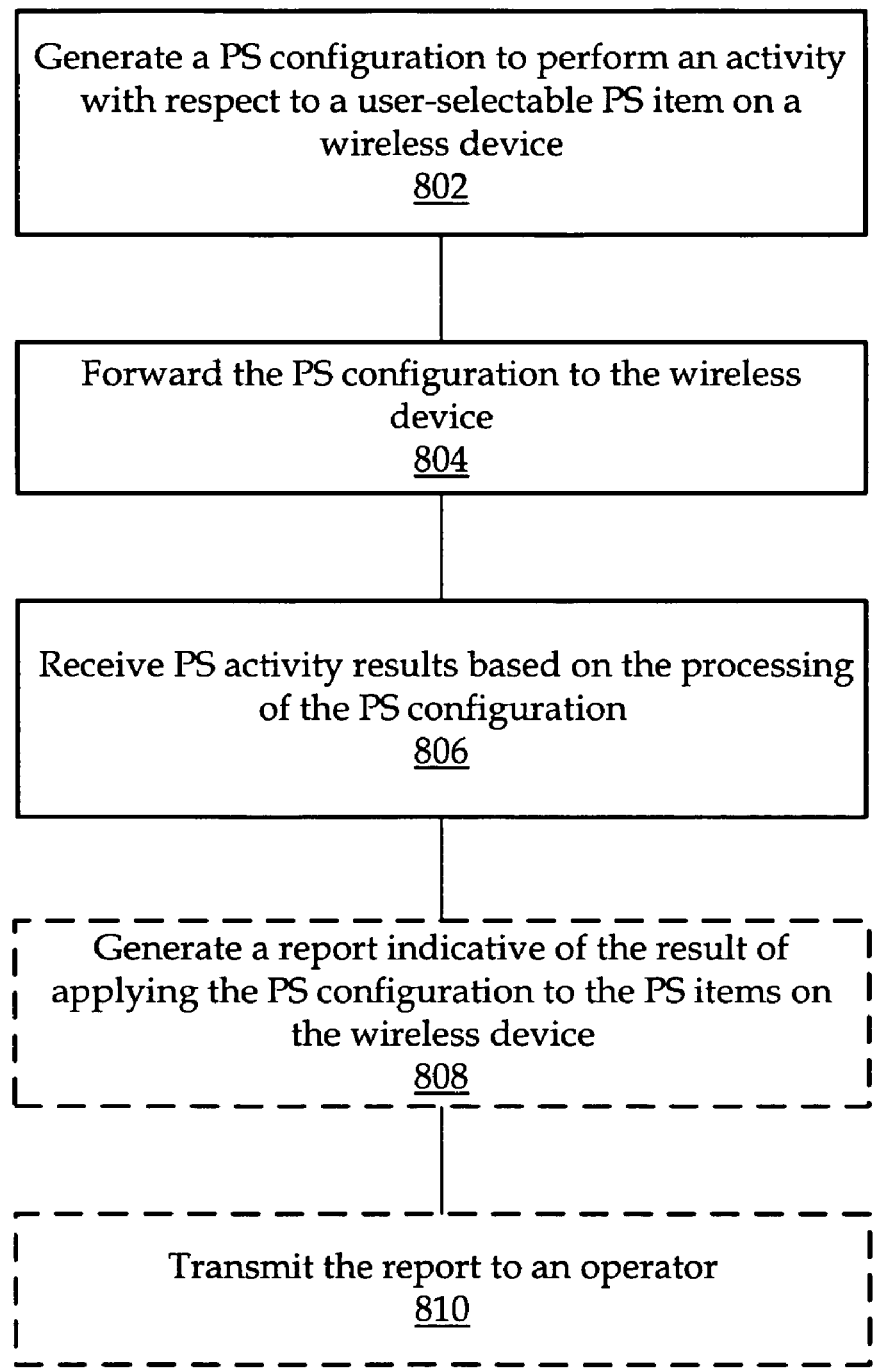
FIG. 9 is a flowchart of one embodiment of a method operable on an apparatus for retrieving and/or changing persistent storage items on the wireless device.

Referring to FIG. 9, one embodiment of a method operable on an apparatus to retrieve or change the value of persistent storage items 28 on wireless device 12, which in some aspects utilizes a consistent user interface, includes generating a persistent storage configuration (Block 802). In one embodiment, a user such as a technician or operator 23 accesses remote service programming module 21 and executes configurator module 44 to generate persistent storage configuration 65 for a given wireless device 12. Configurator module 44 may utilize configuration logic 56 to determine and/or customize the various parameters that comprise configuration 65, and these parameters may vary depending on device-related and/or network-related information, such as the type/make/model of the wireless device, the actual network service provider, and the type of firmware. Configurator module 44 may also utilize user-interface generator module 79 to provide a consistent user interface to the user as was discussed above.

Further, this embodiment of the method includes forwarding the persistent storage configuration to the wireless device (Block 804). For example, user manager module 40 may transmit persistent storage configuration 65 across wireless network 42 to wireless device 12. Alternatively, in another embodiment, configuration 65 may be forwarded through a static or serial connection to wireless device 12. In another alternative, configuration 65 may be preloaded on wireless device 12 during manufacture.

Further, this embodiment of the method includes receiving persistent storage activity result information from the wireless device 12 based on the persistent storage configuration 65 (Block 806). For example, user manager module 40 may receive information log 46, including persistent storage activity result 47 and/or configuration 65, from wireless device 12. The data in information log 46 corresponds to a processing of persistent storage configuration 65 by the respective wireless device 12. Additionally, in one embodiment, the user manager module 40 receives information log 46 over wireless network 42. Further, information log 46 may be received either as a whole or in pieces and assembled by user manager module 40 and/or remote service programming module 21. In another embodiment, user manager module 40 receives the information log 46 by a static or serial connection to the wireless device 12, or from some other computer device or storage media in communication with user manager 40.

Optionally, one embodiment of the method includes generating a report, based on the data in information log 46 (Block 808). The report may be generated by an analyzer 49 and may simply report the result of the wireless device 12 having processed the persistent storage configuration 65, such as providing the value of persistent storage item 28, or it may simply be a report reporting the results of setting an persistent storage item 28. The report may be part of an interaction with a user and may be part of a consistent user-interface generated by the user-interface generator module 79. The analyzer 49 may also compare the information log 46 with predetermined persistent storage values 126 and report the results of this comparison, e.g. persistent storage items are properly set on this wireless device, or persistent storage items need to be reset on this wireless device, etc. Further, the analyzer logic 125 may generate a persistent storage configuration 65 based on the results of the comparison of the information log 46 and the predetermined persistent storage values 126. The analyzer logic 125 can in this embodiment maintain the persistent storage items of wireless device 12 to a standard set of predetermined persistent storage values 126 or set all wireless devices 12 of a certain type to a set of predetermined persistent storage values 126.

Optionally, in one embodiment, the report is forwarded for analysis (Block 810). For example, service programming module 21 may execute service programming logic 25 to transmit report 61 to another computer device, the user of wireless device, or a third party for review. In one embodiment, service programming module 21 transmits report 61 to computer device 22 for review by operator 23. Operator 23 may take action based on report 61, such as sending the user of the respective wireless device 12 a request to have the wireless device 12 replaced. In another embodiment, the analysis of report 61 results in the operator 23 initiating the user manager module 40 to change persistent storage items 28 on the wireless device 12.

Thus, the described embodiments allow a party, such as a wireless network service provider, a wireless device manufacturer, a firmware manufacturer, a hardware and/or software manufacturer, etc., to retrieve and/or change persistent storage items 28 on a wireless device 12. For example, the network service provider may need to detect compromised persistent storage items 28 so that they may provide good service to their customers and generate revenue.

Additionally, the described embodiments allow the manufacturers of the wireless devices to configure persistent storage items 28 with an application that provides a consistent user interface for different wireless devices, different service providers and/or different versions of hardware/software/firmware so that an application does not have to be written for each specific wireless device. Further, the described embodiments allow for notifying the user of the wireless device that the wireless device needs to be repaired. In this case, disabling the wireless device may, at least, inconvenience the user of the wireless device and may cause the network service provider to lose revenue. Further, rather than disabling the device or requesting that the user of the wireless device have the wireless device serviced, the described embodiments provide changing the persistent storage items in order to restore good operation of the wireless device.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable module device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. A wireless communication device operable in a cellular communications system, the device comprising:
a processing engine;
a computer platform having a persistent storage comprising a plurality of persistent storage items each corresponding to a characteristic of the wireless device, the plurality of persistent storage items including a plurality of cellular telephone service related items;
a service programming module operable to perform an activity on a selected one of the plurality of cellular telephone service related items, based on a persistent storage configuration comprising a program;
wherein the program is associated with data relating to the activity to perform on the selected one of the plurality of cellular telephone service related items;
wherein the computer platform further comprises a volatile memory;
wherein the selected one of the plurality of persistent storage items is present in both the persistent storage and the volatile memory;
wherein both a value of the selected persistent storage item in the persistent storage and a corresponding value of the selected persistent storage item in the volatile memory is changed by the execution of the program, the persistent storage being updated with the changed value; wherein the wireless device remains booted while executing the program until a wireless device user subsequently utilizes the selected one of the persistent storage items; and
wherein a persistent storage access time associated with the time for the processing engine to retrieve the selected one of the plurality of cellular telephone service related items from the persistent storage is defined;
wherein a volatile memory access time associated with the time for the processing engine to retrieve the selected one of the plurality of cellular telephone service related items from the volatile memory is defined; and
copying the persistent storage items to the volatile memory when the persistent storage access time is greater than the volatile memory access time.

2. The device of claim 1, wherein the selected cellular telephone service related item further comprises a mobile directory number (MDN) or an electronic serial number.

3. The device of claim 1, wherein persistent storage configuration is received by the wireless device from across a wireless network.

4. The device of claim 1, further comprising a user-interface generator module; wherein the user-interface generator module comprises a consistently ordered sequence of menus represented by at least a first view having plural entries for carriers, and a second view having plural entries for device make/models, with at least a third view containing persistent storage items to be retrieved and changed; and
wherein a user can select persistent storage items to be retrieved and changed for any one of the carriers and for any one of the device make/models.

5. The device of claim 4, further comprising a virtual machine operable to the program to perform the activity.

6. The device of claim 1, wherein the selected cellular telephone service related item is a preferred roaming list (PRL), a slot cycle index, a cellular telephone communication protocol-related transmit and receive setting, an air interface setting, a subscription setting, or a call management setting.

7. The device of claim 1, further comprising a persistent storage item repository operable to store the results of applying the persistent storage configuration to the selected one of the plurality of persistent storage items of the wireless device.

8. The device of claim 7, wherein at least a portion of the persistent storage item repository is stored at the wireless device and selectively transmitted to another computer device across the wireless network.

9. The device of claim 4, wherein user interface information containing the entries for carriers and device make/models is in a form interpretable by a computer apparatus.

10. The device of claim 1, wherein the persistent storage configuration further comprises a reference to at least two of a persistent storage item, the activity performable relative to the persistent storage item, and an access identification associated with an originator of the persistent storage configuration, wherein the computer platform further comprises a persistent storage access control module operable to make an access decision based on at least one of the persistent storage item, the activity, and the access identification.

11. A method of managing a plurality of persistent storage items on a wireless device operable in a cellular communications system, the method comprising:
   storing, by a computer platform, the plurality of persistent storage items each corresponding to a characteristic of the wireless device, the plurality of persistent storage items including a plurality of cellular telephone service related items residing in both a persistent storage and a volatile memory associated with the wireless device;
   obtaining a persistent storage configuration comprising a program and identifying an activity and a selected one of the plurality of persistent storage items on the wireless device upon which to perform the activity, wherein the selected one of the plurality of persistent storage items is present in both the persistent storage and the volatile memory, wherein the program is associated with data relating to the activity to perform on the selected one of the plurality of cellular telephone service related items;
   executing the program to perform the activity on the selected telephone service related item, the activity comprising changing a value of the selected service related item and updating both the persistent storage and the volatile memory with the changed value; wherein the wireless device remains booted while executing the program until a wireless device user subsequently utilizes the selected one of the persistent storage items; and
   defining a persistent storage access time associated with the time for a processing engine to retrieve the selected one of the plurality of cellular telephone service related items from the persistent storage;
   defining a volatile memory access time associated with the time for the processing engine to retrieve the selected one of the plurality of cellular telephone service related items from the volatile memory; and
   copying the persistent storage items to the volatile memory when the persistent storage access time is greater than the volatile memory access time.

12. The method of claim 11, wherein the selected cellular telephone service related item further comprises a mobile directory number (MDN) or an electronic serial number.

13. The method of claim 11, wherein obtaining a persistent storage configuration further comprises receiving the persistent storage configuration from across a wireless network.

14. The method of claim 11, further comprising:
   selecting from among a plurality of entries for cellular telephone carriers, and from among a plurality of entries for wireless device make/models, the make/models having different processing engines and different software configurations;
   selecting one of the cellular telephone service related items via a user interface of the wireless device, in conjunction with a selected carrier and a selected wireless device make/model;
   wherein the selecting from a plurality of entries comprises displaying and selecting from a consistently ordered sequence of menus represented by at least a first view having plural entries for carriers, and a second view having plural entries for device make/models, with at least a third view containing persistent storage items to be retrieved and changed; and
   wherein a user can select persistent storage items to be retrieved and changed for any one of the carriers and for any one of the device make/models.

15. The method of claim 11, wherein the selected cellular telephone service related item further comprises a preferred roaming list (PRL), a slot cycle index, a cellular telephone communication protocol-related transmit and receive setting, an air interface setting, a subscription setting=, or a call management setting.

16. The method of claim 11, further comprising storing results of executing the program.

17. The method of claim 16, further comprising selectively transmitting a result of executing the program to another computer device across a wireless network.

18. The method of claim 14, wherein user interface information containing the entries for carriers and device make/models is in a form interpretable by a computer apparatus, and wherein the selecting from among a plurality of entries is performed by the computer apparatus.

19. The method of claim 11, further comprising generating an access decision prior to executing the activity, wherein the access decision is based on the selected one of the plurality of persistent storage items, the activity, and an access identification associated with the persistent storage configuration.

20. The method of claim 11, further comprising obtaining a service programming module operable to receive and execute tile persistent storage configuration.

21. A wireless device operable in a cellular communications system, comprising:
   means for storing a plurality of persistent storage items each corresponding to a characteristic of the wireless device, the plurality of persistent storage items including a plurality of cellular telephone service related items residing in both a persistent storage and a volatile memory associated with the wireless device;
   means for obtaining a persistent storage configuration comprising a program and identifying an activity and a selected one of the plurality of persistent storage items on the wireless device upon which to perform the activity, wherein the selected one of the plurality of persistent storage items is present in both the persistent storage and the volatile memory, wherein the program is associated with data relating to the activity to perform on the selected one of the plurality of cellular telephone service related items;
   means for executing the program to perform the activity on the selected telephone service related item, the activity comprising changing a value of the selected telephone service related item and updating both the persistent storage and a volatile memory on the wireless device with the changed value; wherein the wireless device remains booted while executing the program until a wireless device user subsequently utilizes the selected one of the persistent storage items; and
   means for defining a persistent storage access time associated with the time for a processing engine to retrieve the selected one of the plurality of cellular telephone service related items from the persistent storage;
   means for defining a volatile memory access time associated with the time for the processing engine to retrieve the selected one of the plurality of cellular telephone service related items from the volatile memory; and
   means for copying the persistent storage items to the volatile memory when the persistent storage access time is greater than the volatile memory access time.

22. A non-transitory machine-readable medium comprising instructions which, when executed by a machine, cause the machine to perform operations including:
   storing a plurality of persistent storage items each corresponding to a characteristic of a wireless device, the plurality of persistent storage items including a plurality of cellular telephone service related items residing in both a persistent storage and a volatile memory associated with the wireless device;

obtaining a persistent storage configuration comprising a program and identifying an activity and a selected one of a plurality of persistent storage items on a wireless device upon which to perform the activity, wherein the selected one of the plurality of persistent storage items is present in both the persistent storage and the volatile memory, wherein the wireless device is operable in a cellular communication system and the plurality of persistent storage items include a plurality of cellular telephone service related items, wherein the program is associated with data relating to the activity to perform on the selected one of the plurality of cellular telephone service related items;

executing the program to perform the activity on the selected telephone service related item, the activity comprising changing a value of the selected telephone service related item and updating both the persistent storage and a volatile memory on the wireless device with the changed value; forwarding a result of executing the activity on the selected service related item; wherein the wireless device remains booted while executing the program until a wireless device user subsequently utilizes the selected one of the persistent storage items; and defining a persistent storage access time associated with the time for a processing engine to retrieve the selected one of the plurality of cellular telephone service related items from the persistent storage;

defining a volatile memory access time associated with the time for the processing engine to retrieve the selected one of the plurality of cellular telephone service related items from the volatile memory; and copying the persistent storage items to the volatile memory when the persistent storage access time is greater than the volatile memory access time.

* * * * *